United States Patent
Hartman et al.

(10) Patent No.: US 9,386,083 B2
(45) Date of Patent: *Jul. 5, 2016

(54) MANAGED SERVICES PLATFORM

(71) Applicant: zVelo, Inc., Greenwood Village, CO (US)

(72) Inventors: Robert Charles Hartman, Aurora, CO (US); John Elton Dietrich, II, Cary, NC (US); Jeffrey James Finn, Englewood, CO (US); Rodney Dean Holm, Evergreen, CO (US)

(73) Assignee: ZVELO, INC., Greenwood Village, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/610,529

(22) Filed: Jan. 30, 2015

(65) Prior Publication Data

US 2015/0149538 A1    May 28, 2015

Related U.S. Application Data

(63) Continuation of application No. 13/915,814, filed on Jun. 12, 2013, now Pat. No. 8,977,762, which is a continuation of application No. 11/537,224, filed on Sep. 29, 2006, now Pat. No. 8,572,267, which is a continuation of application No. 11/154,891, filed on Jun. 16, 2005, now Pat. No. 8,266,304, which is a continuation of application No. 09/766,469, filed on Jan. 19, 2001, now Pat. No. 6,961,773.

(51) Int. Cl.
| | |
|---|---|
| *G06F 15/16* | (2006.01) |
| *H04L 29/08* | (2006.01) |
| *G06F 9/445* | (2006.01) |
| *G06Q 10/06* | (2012.01) |
| *H04L 29/06* | (2006.01) |

(52) U.S. Cl.
CPC ........ *H04L 67/10* (2013.01); *G06F 8/61* (2013.01); *G06Q 10/06* (2013.01); *H04L 67/16* (2013.01); *H04L 67/306* (2013.01); *H04L 67/42* (2013.01); *H04L 69/329* (2013.01)

(58) Field of Classification Search
CPC ................................. G06F 8/61; H04L 67/42
USPC .................................................. 709/226, 229
See application file for complete search history.

(56) References Cited

U.S. PATENT DOCUMENTS 7,062,567 B2 *    6/2006    Benitez et al. ................ 709/231

\* cited by examiner

*Primary Examiner* — David Lazaro
*Assistant Examiner* — Marie Georges Henry
(74) *Attorney, Agent, or Firm* — Neugeboren O'Dowd PC

(57) ABSTRACT

A managed services platform. An applications management server is provided for managing relationships with application service providers and others over a wide area network such as the Internet. The applications management server interfaces with a master database server and the servers of one or more application service providers, or other entities, to facilitate selection and deselection of applications, services, and capabilities that may be available for use by the information technology network of a company.

20 Claims, 7 Drawing Sheets

SoftPak Director

User License Level -- This is the user license level your Instagate EX is currently licensed for. Any SoftPaks that do not have their own user license level will automatically be subscribed at this level. You may select a new user license level to upgrade/downgrade your system by selecting the new level from the pulldown menu and pressing the "Change" button. Any SoftPaks you are currently subscribed to will have their monty fees adjusted accordingly.

25 Users
110

Change
112

Anti-Virus -- Provides inspection of inbound and intra-office email attachments for known computer viruses.
This service has been selected but not yet downloaded Unsubscribe
106(b)

Firewall Policy Manager -- Provides granular management of firewall policy and additional logging capabilities.
Subscribe for only: 115.00/yr Subscribe
106(c)

Internet Server -- Web, FTP, and Domain Name servers.
Subscribe for only: 115.00/yr Subscribe
106(c)

Modem Communication -- RAS and Failover support.
Subscribe for only: 175.00/yr Subscribe
106(c)

SiteFilter -- Provides URL web site filtering and blocking based on a dynamic URL database.
Subscribe for only: 540.00/yr Subscribe
106(c)

Install Now
116

Install new/updated software. The machine will reboot itself during this process.
You will need to restart your browser to access you new SoftPak.

FIGURE 4(c).

MANAGED SERVICES PLATFORM

CROSS-REFERENCES TO RELATED APPLICATIONS

This application is a continuation of application Ser. No. 13/915,814 filed Jun. 12, 2013, which is a continuation of application Ser. No. 11/537,224 filed Sep. 29, 2006 which is a continuation of application Ser. No. 11/154,891, filed Jun. 16, 2005 now U.S. Pat. No. 8,266,304, which is a continuation of application Ser. No. 09/766,469, filed Jan. 19, 2001, now U.S. Pat. No. 6,961,773, the contents of which are hereby incorporated by reference.

FIELD OF THE INVENTION

The present invention relates to software management systems and, more particularly, to systems and methods for selecting, ordering, installing, managing, updating, and if necessary, uninstalling software applications provided to an entity by one or more application service providers (ASPs) or other sources.

BACKGROUND OF THE INVENTION

Recently, substantial attention has been directed to the field of software management tools. One reason for this is that many vendors or purveyors of software now distribute their products directly to customers via wide area networks such as the Internet. Such vendors often are referred to as "Application Service Providers" or "ASPs." Generally, businesses use ASPs as a means for outsourcing information technology (IT) functions to specialists. Moreover, rather than purchasing expensive software, high-powered computers, high-end telecommunications equipment, and the like, companies often now choose to rent or lease applications from ASPs, and they often access or use selected applications through the Internet. While this model allows companies to achieve significant savings from a hardware and software purchasing and maintenance perspective, the model may introduce significant management issues, where for example, multiple ASPs provide applications to a single entity.

Accordingly, it is believed that businesses may find systems, methods, and applications for managing ASP relationships to be quite useful.

SUMMARY OF THE INVENTION

In one particularly innovative aspect, the present invention is directed to systems and methods for enabling a company to manage its relationships with one or more ASPs, or other software sources. In one presently preferred embodiment, an applications management server may be deployed within a company and used to interface with a master database server and the servers of one or more ASPs. The interface preferably occurs via the Internet, thus enabling a personal computer, web computer, or other network appliance coupled to the management server to interact with the master database server and the servers of the ASPs.

For example, using a browser application provided on a personal computer, it is possible interact with the management server and query the master database server to identify those applications, services, and subscriptions that are available, as well as those which are currently being utilized within a company. Further, through the use of an appropriate graphic user interface (GUI) a user of the browser may add selected applications, functions, or capabilities to the company network, and the user may remove applications, functions, or capabilities that are no longer needed by the company. The result of these actions may be communicated, for example, through the Internet to the master database server, and the master database server may thereafter interact with any relevant ASP servers to enable or disable selected applications, functions, or features. In addition, the master database server may provide electronic messages to any personnel having responsibility for tasks necessary to carry out a transaction or complete an action.

Accordingly, it is an object of the invention to provide improved systems, methods, and applications for managing ASP relationships over a wide area network, such as the Internet.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

FIGS. 4(a)-4(d) comprise a series of screen images that may be used by a GUI in accordance with the present invention.

DETAILED DESCRIPTION

Figure 1:
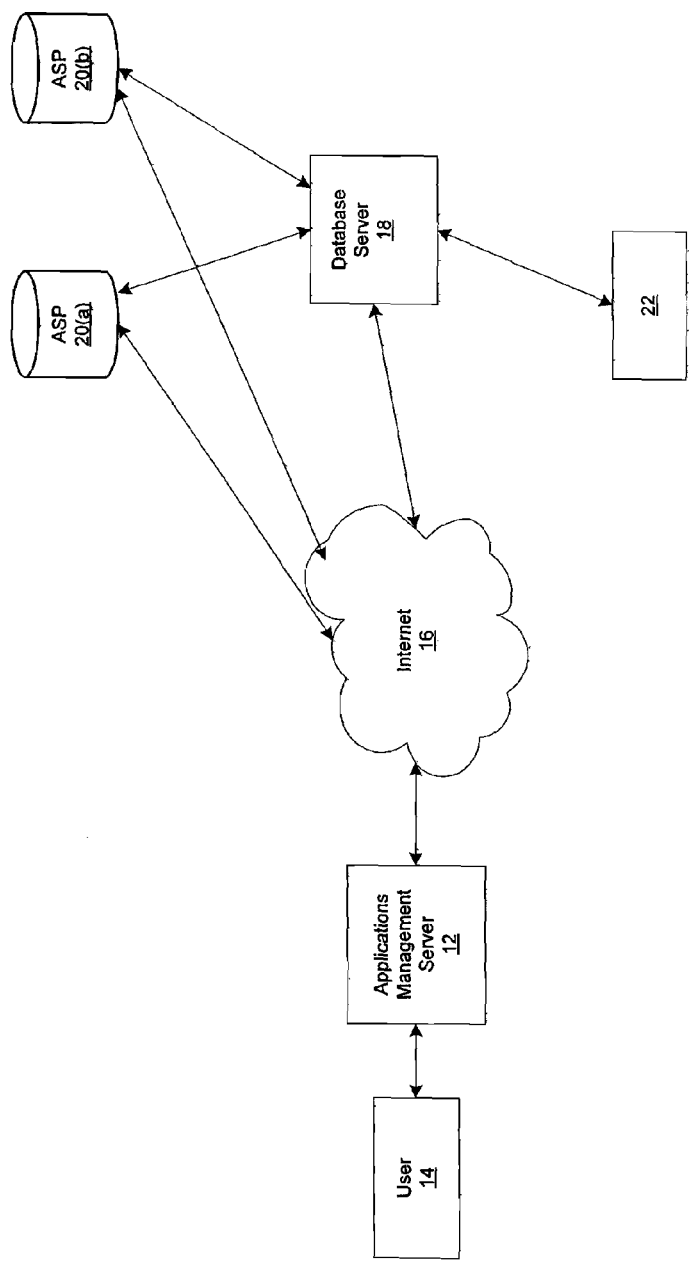
FIG. 1 is a block diagram illustrating a system for managing ASP and other relationships over a wide area network, such as the Internet, in accordance with a preferred form of the present invention.

As shown in FIG. 1, in one presently preferred form, a system 10 for managing ASP and other relationships over a wide area network 16, such as the Internet, may comprise an applications management server 12, a personal computer, web computer, or other network appliance 14, a wide area network 16, a master database server 18, and a plurality of ASP servers 20(a) and 20(b). The applications management server 12 and the master database server 18 may be implemented using standard PC compatible hardware including, for example, a 400 MHz CELERON® processor manufactured by Intel Corporation. However, in one presently preferred form, the master database server 18 comprises a 733 MHz PENTIUM® processor manufactured by Intel Corp., 512 MB of RAM (or other suitable memory), and AMI Megaraid SCSI RAID hardware configured to make three 9G disks look like one 18G disk in RAID5 mode. The applications management server 12 preferably comprises a 500 MHz CELERON® processor manufactured by Intel Corp., 64 MB of RAM (or other suitable memory), and a 10.2 GB hard disk drive.

The applications management server 12 and master database server 18 may be coupled to the Internet 16 via dial up, ISDN, DSL, or any other protocol that supports TCP/IP. The master database server 18 also may employ database management software available from any of a number of vendors including Microsoft Corp., Oracle Corp., and Sleepy Cat, Inc.

The applications management server 12 may be deployed within a company and used to interface with the master database server 18 and the servers of one or more ASPs 20(a) and 20(b). The interface preferably occurs via the Internet 16, thus enabling a personal computer, web computer, or other network appliance 14 coupled to the applications management server 12 to interact with the master database server 18 and the servers of the ASPs 20(*a*) and 20(*b*).

For example, using a browser application (not shown) provided on the personal computer 14, it is possible to interact with the applications management server 12 and query the master database server 18 to identify those applications, services, and subscriptions that are available, as well as those which are currently being utilized within a company. Further, through the use of an appropriate graphic user interface (GUI), a user of the browser (not shown) may add selected applications, functions, or capabilities to the company network, and the user may remove applications, functions, or capabilities that are no longer needed by the company. The result of these actions may be communicated, for example, through the Internet 16 to the master database server 18, and the master database server 18 may thereafter interact with any relevant ASP servers 20(*a*) and 20(*b*) to enable or disable selected applications, functions, or capabilities. In addition, the master database server 18 may provide electronic messages to any personnel 22 having responsibility for tasks necessary to carry out a transaction or complete an action.

Figure 2:
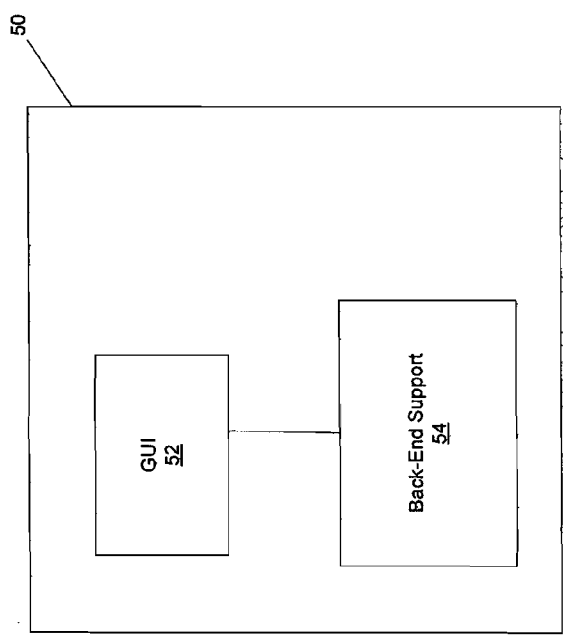
FIG. 2 is a block diagram illustrating the components of a software subscription management module in accordance with a preferred form of the present invention.

In one presently preferred embodiment, a software subscription management module 50, shown in FIG. 2, will be configured on the applications management server 12, and the software subscription management module 50 may comprise a graphic user interface (GUI) submodule 52 and a backend support submodule 54. As will be described in more detail below, using a typical browser application, such as Microsoft Explorer® or Netscape Navigator®, the user (not shown) of the personal computer 14 may access the GUI submodule 52 provided on the applications management server 12, and by interfacing with the GUI, may view a list of applications, services, or capabilities that are provided on a network (not shown) of a company, as well as, a list of applications, services, or capabilities that are available for use by the network. The user also may access historical data relevant to the network using the GUI.

In a preferred form, all queries issued by the applications management server 12 are in the form of hypertext transfer protocol (HTTP) requests and include a unique ID for the management applications server as part of a Uniform Resource Locator (URL). Those skilled in the art will appreciate, however, that other communications protocols, such as file transfer protocol (FTP) or hypertext transfer protocol secure (HTTPS), also may be used for queries issued by the applications management server 12.

Figure 3:
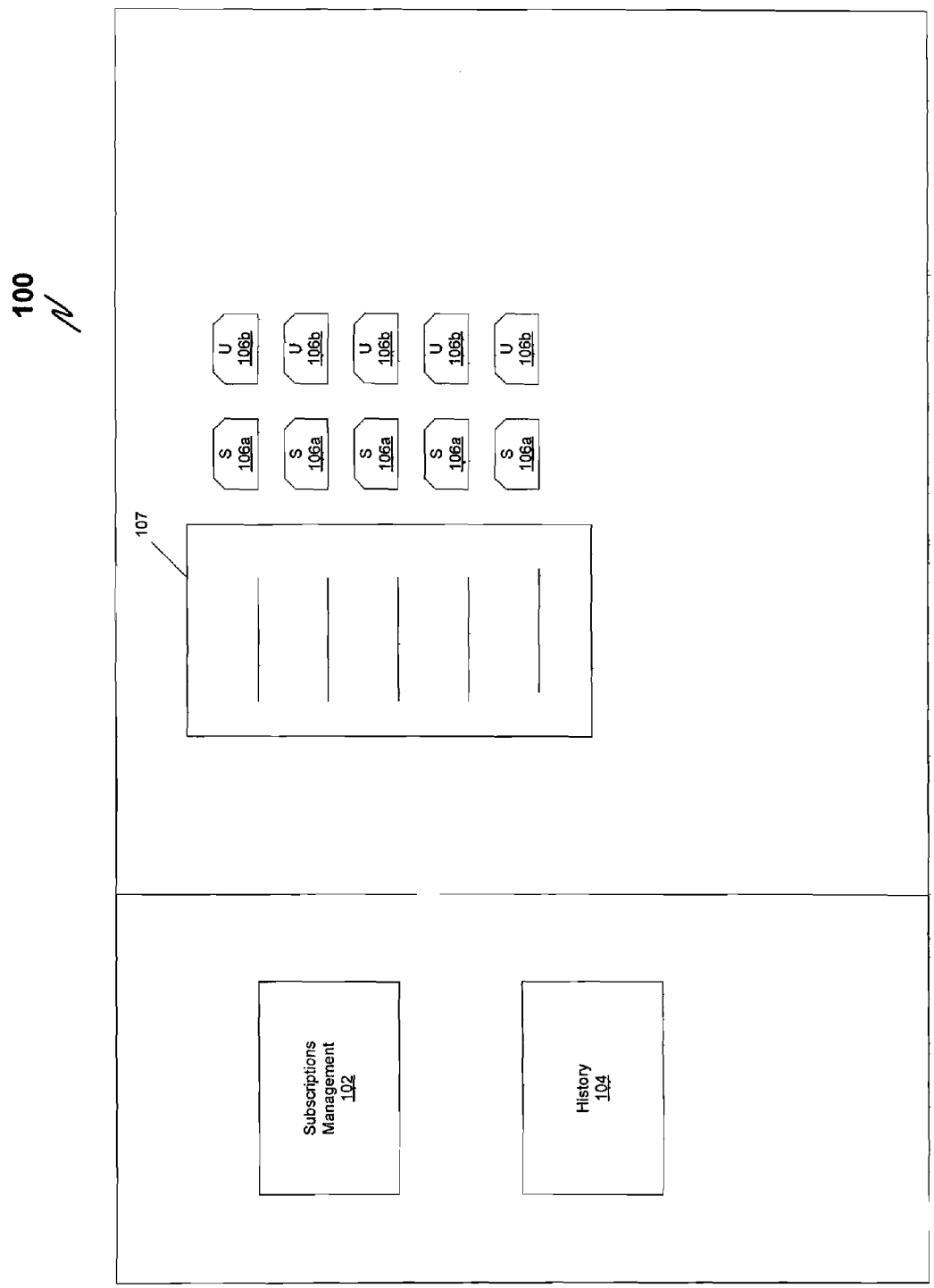
FIG. 3 is an illustration of a graphic user interface (GUI) used in accordance with the present invention.

Turning now to a description of the GUI, the GUI 100, shown in FIG. 3, preferably includes a subscription management item 102 and, if desired, a subscriptions history item 104. The subscription management item 102 may be used to retrieve a display of all applications, services, and capabilities that are available to the network, together with a plurality of "subscribe" and "unsubscribe" buttons 106(*a*) and (*b*) for enabling a user to select one or more offerings for use by the system. The subscriptions history item 104 may be used to display, for example, a chronological history of those offerings that have been utilized by the network in the past.

Using the GUI 100, a system administrator 14 can retrieve a list 107 of available applications or services, and using the displayed list, the administrator 14 can select desired items to be installed on the applications management server 12, or other servers (not shown), within a local area network (LAN) or wide area network (WAN). The administrator also may view a history of all applications or services that have been selected for use within network over a prescribed period of time.

Preferably, the GUI 100 issues back-end commands that will cause any necessary HTTP requests to be generated, and information returned from the applications management server 12 or the master database server 18 will be parsed, formatted, and sent to a standard output. The GUI 100 may then read in the output from the back-end process and display the information to the administrator 14 along with any necessary interactive items, such as the subscribe and unsubscribe buttons 108(*a*) and (*b*) described above.

Preferably, whenever a list 107 of available services or applications is presented to an administrator, the list 107 will include all available applications or services, and the administrator 14 will be allowed to select services or applications for subscription or cancellation. The history item 104 may be used to display a chronological history of selected services or applications.

Figure 4A:
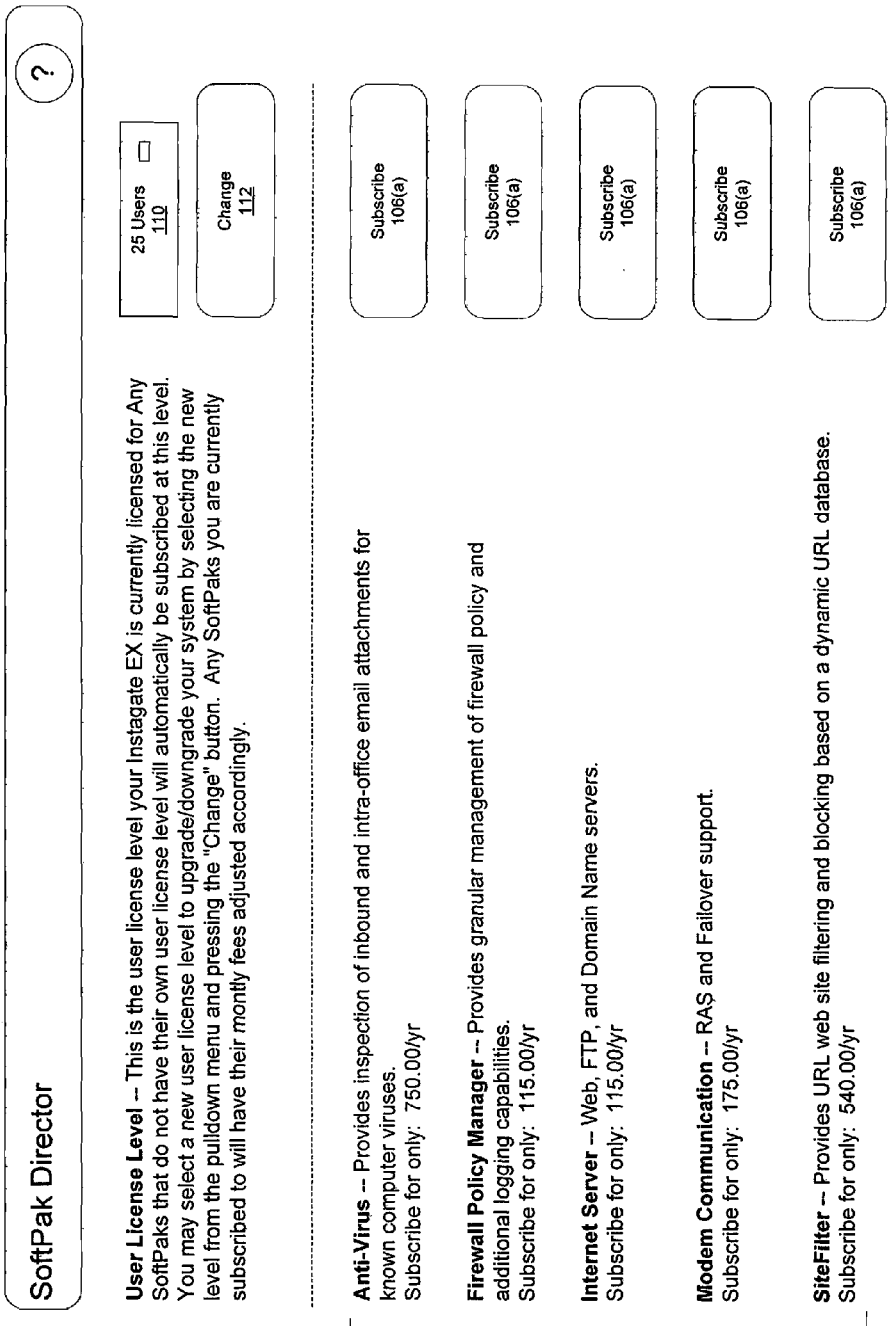
Figure 4B:
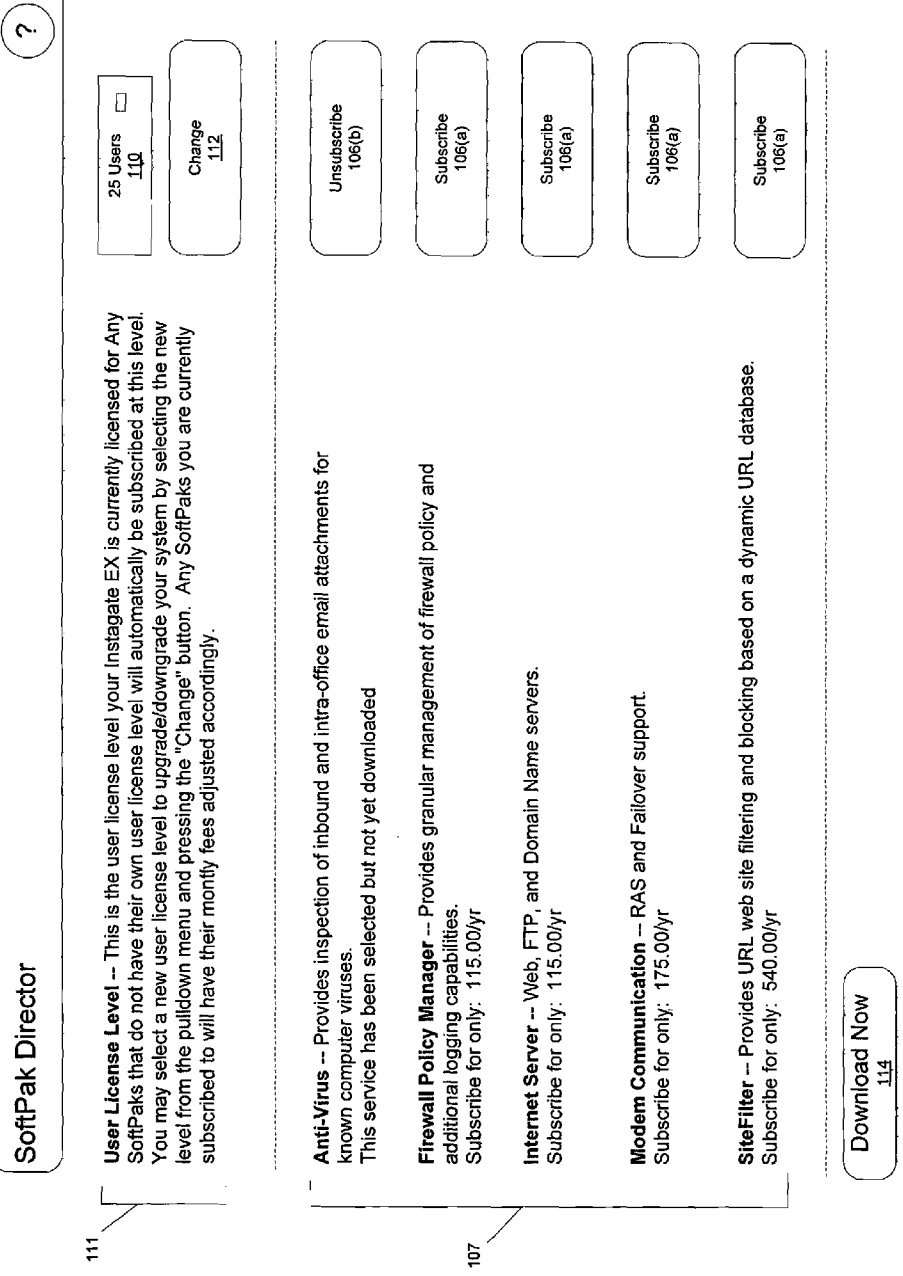
Figure 4D:
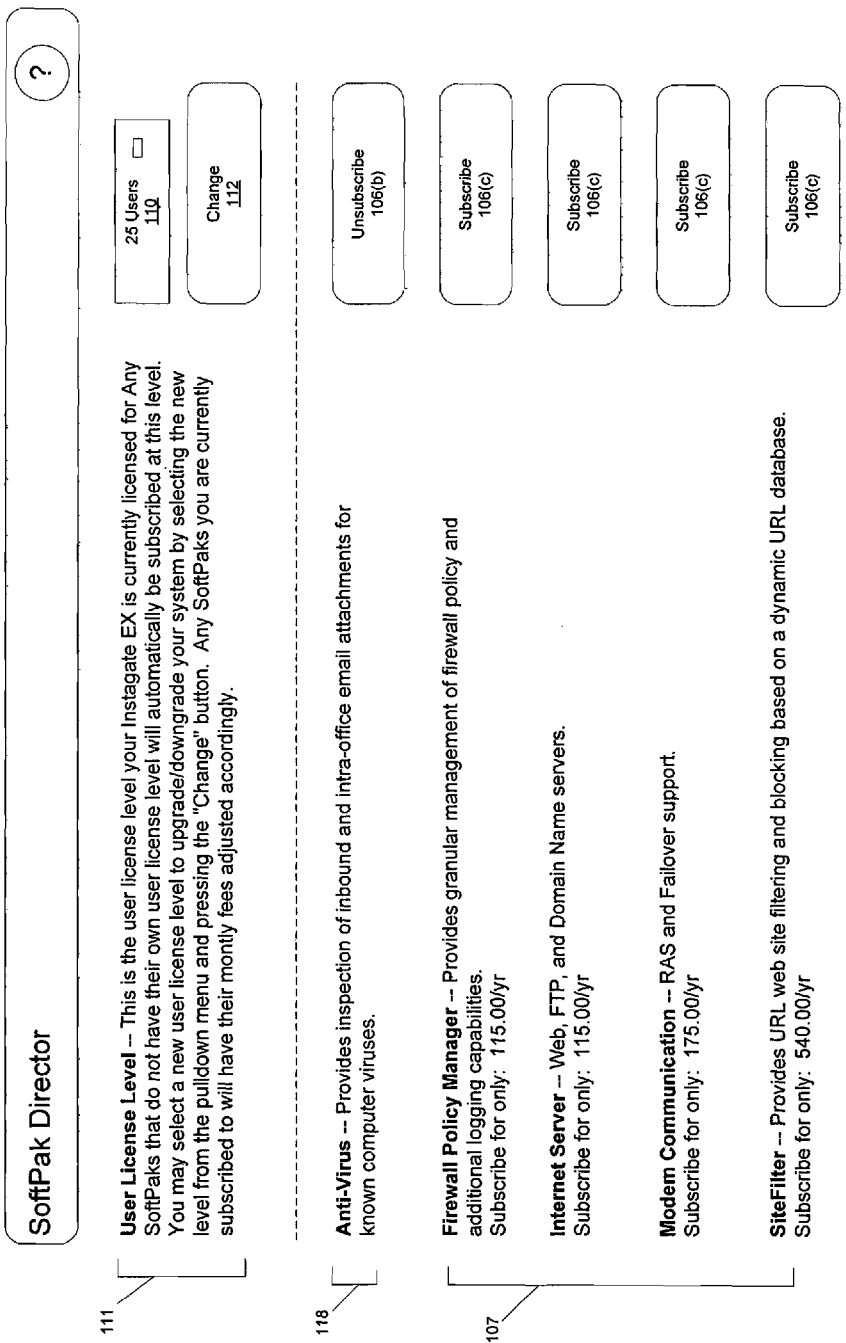

Turning now to FIGS. 4(*a*)-(*d*), in accordance with another preferred form of the present invention the GUI 100 may include a series of screen images that include a field 111 denoting the number of application licenses 110 that may be required for a given enterprise and a list of services or applications 107 that are available to the enterprise. If it is desired to change the number of licenses required by the enterprise, a user of the system may simply click on a change button 112 to access, for example, a pulldown menu (not shown) offering different licensing levels. The user also may initiate a subscription sequence by clicking on a subscribe button 106(*a*) provided adjacent one of the application listings. Following initiation of the subscription sequence, the user may be presented with another screen 103, which includes a download now button 114 for initializing an application download sequence and an unsubscribe button 106(*b*) adjacent the selected application. If the user clicks on the download now button 114 an application download sequence will be initiated, and the user may be presented with a new screen 105 including an install now button 116. By clicking on the install now button, the user may cause the selected application to be installed on the applications management server 12 or, if desired, on another server (not shown) included within the users LAN. Lastly, one the selected application has been installed, the user may be presented with a screen 109 that includes a check icon 118 adjacent the service that has been selected and installed upon the user's network.

Table 1, below, provides an exemplary representation of the components comprising the subscriptions management item 102 (shown in FIG. 3), wherein "xxx" comprises the name of the service or application that will be subscribed to or unsubscribed from.

TABLE 1

| Form Field Name | Form Field Type | Corresponding ti.conf Variable | Appears in Form |
|---|---|---|---|
| subscribe_xxx | Submit button | SUBSCRIPTION_ADD_SERVICES | SnapIn.php |
| unsubscribe_xxx | Submit button | SUBSCRIPTION_ADD_SERVICES | SnapIn.php |

Turning now to a description of the backend support module 54 and related system programs, the backend support module 54 employs several scripts and routines described below to enable selection or deselection of services or applications in response to instructions received from the GUI 100.

In one preferred embodiment, a sysSubscriptionQuery routine, comprising a perl script, is used to create http queries for Peabody Software service APIs using inputs to the script and two ti.conf variables. A returned value from the query is sent to the standard output (not shown) of the GUI 100.

A sysSubscriptionQuery: System Calling routine passes an API name as a first parameter and, if necessary, a service identifier as a second parameter. Thus, the call does not require a service identifier. An exemplary call for a service listing may read as follows: /use/local/ti/bin/sysSubscriptionQuery GetServices. Whereas, a call to subscribe to a particular service requires an identification of the service to be subscribed to and may read as follows: /use/local/ti/bin/sysSubscriptionQuery Subscribe 100.

A sysSubscriptionQuery: System Operation routine enables the hostname of a server (not shown) to query and the path to an API script to be pulled from the ti.conf variable SUBSCRIPTION_QUERY_HOST_PATH. The API passed to this program is used as part of the name of the script to call on the server (not shown). The query to the script preferably comprises a DeviceKey, stored in SERIAL_NUMBER, and optionally a ServiceID, e.g., the name of the service to be subscribed to. Preferably, a HTTP::Request object is created with a GET method, and an LWP::UserAgent request is made using the HTTP::Request object. The response to the request is stored in a HTTP::Response object. If the request is successful the content of the response is sent to the standard output (not shown) of the GUI 100. Otherwise, an error is printed as a HTML document. Those skilled in the art will appreciate that in some circumstances the Response object may be parsed and formatted prior to being printed to the standard output (not shown).

In one preferred form, a SusUnsubscribe script uninstalls any RedHat Package Managers (RPMs) associated with a service being unsubscribed, and a SetServiceDisabled request is sent to the subscription server. In addition, a susUnsubscribe:System Calling script is called with the name of the service to unsubscribe. The script may read as follows: /use/local/ti/bin/sysUnsubscripe 100.

A sus Unsubscribe:System Operation script may be used to check a repository directory in /usrlocal/redphish/snapin for a directory that matches a servicename. If there is no matching service name, then an error is reported, and the service is not unsubscribed. If the directory exists, a rpm -e command may be issued against each rpm in the directory. After the packages are uninstalled the directory and the files within are deleted.

A sysUpdateSubscriptions script may be used to check for a SUBSCRIPTION_ADD_SERVICES array in ti.conf and for each service listed may download the relevant files and install them on the applications management server 12.

To perform service installations, a sysUpdateSubscriptons: System Operation routine is preferably utilized. Thus, for each service listed in SUBSCRIPTION_ADD_SERVICES a GetServiceLocation query is made to the subscription server. The information returned from the server is used to transfer (via ftp) the RPMs to a Peabody system. Once all of the RPMs for a service have been downloaded they may be installed with the following command: rpm -U*.rpm. If any of the RPM packages fail to load, then none of them will be loaded. When a loading failure occurs, two additional loading attempts will be made to download and install the relevant files, before a given loading process will be abandoned, and installation of the next service will be initiated. If all the packages install then the service name will be removed from the SUBSCRIPTION_ADD_SERVICES array.

Table 2, below, sets forth a preferred set of data structures that may be used in accordance with the present invention.

TABLE 2

Statement format with default values (if any) and description
STATEMENT= <arg1>m<arg2>m <arg3>,?,<argN
Where <arg1>is?.

SUBSCRIPTION_QUERY_HOST_PATH=<URL
Where <URL>is the hostname and path to the script that process the queries. This is set the first time the subscription software is run.
Default: blank
SUBSCRIPTION_ID=<ID>
Where <ID>is the numerical id of the machine. This is set when the subscription software is used for the first time.
Defaults: blank
SUBSCRIPTION_ADD_SERVICES=<service id>
This array is used to store the services selected from the GUI that need to be installed during the next update.
SUBSCRIPTION_INTERVAL=<number of days>
The number of days between updates.
Default: blank In one presently preferred form, the backend support module utilizes a HTTP API for Software Subscriptions Management. Each API call preferably is in the form of a HTTP query with parameters passed as key-value pairs, and each response preferably is a list of key-value pairs in plain text form. The API call preferably has one of the two following formats:

http://<host>/<path>/<API>/.cgi?DeviceID=<DeviceID>
[&ServiceID=<Number>or
http://<host>/<path>/
<GetServiceLocation.cgi?ServiceID=<Number> where: <host> identifies the software subscription server, and the host's name is stored in SOFTWARE_UPDATE_HOST; <DeviceID> is a unique number identifying the machine and may be the serial number of, for example, the applications management server 12 or the MAC address of the Ethernet card of the server 12 that is coupled to the Internet; and <Number> is the numeric identifier of the requested service. It will be appreciated by those skilled in the art that the <DEVICE_ID> also may be a series of numbers followed by a checksum, as would be the case with a typical InstaGate machine of the type that is well known in the art.

As an example, the request set forth below could represent a Subscribe request from a machine with an Ethernet hardware address of 00:AO:CC:69:55:B2 for service 1040—a tax software package. In the example, the subscription server is located at subscriptions.esoft.com, the scripts are in cgi.bin, and the software is located on blades.esoft.com in the directory /home/software/tax. In addition, the software is accessible with the password sn2gg13.

Request:
http://subscriptions.esoft.com/cgi-bin/Subscribe.cgi?DeviceID+00A0CC6955B2&ServiceID=1040
Result:
   Result: 1
Request:
http://subscriptions.esoft.com/cgi-bin/GetServiceLocation-?ServiceID=1040
   Result:
      Hostname:blades.esoft.com
      Path:tax
      Username:softname
      Password:sn2gg13

As explained above, in a preferred form a GetServices request will retrieve a list of available services that can be subscribed to by a requesting machine, and it will indicate which services are already subscribed to. The parameters and return values used in accordance with a GetServices request may comprise those set forth in Tables 3(a) and 3(b), below.

TABLE 3(A)

GetServices: Parameters

| Name | Type | Description |
| --- | --- | --- |
| DeviceKey | Hex Number | Composed of the digits of the MAC address of eht1 |

TABLE 3(B)

GetServices: Return Values

| Name | Type | Description |
| --- | --- | --- |
| ServiceID | Number | a unique identifier for the service |
| ServiceTitle | String | a brief title for the service |
| ServiceDesc | String | a brief description of the service |
| ServiceFee | String | How much the service will cost. |
| Subscribed | Number | Boolean value - 1 for subscribed, 0 for not subscribed |
| StartDate | mm/dd/yyyy | Date subscription started if already subscribed. |
| Enabled | Number | Boolean value - 1 for enabled, 0 for disabled |
| CoreService | Number | Boolean value - 1 for enabled, 0 for disabled |
| Available | Number | Boolean value - 1 indicates the service is available if it is a 0 then the installed service must be disabled. This record is optional. |

The parameters and return values used with a Subscribe request are set forth in Tables 4(a) and 4(b), and the parameters and return values used within an Unsubscribe request are set forth in Tables 5(a) and 5(b), below.

TABLE 4(A)

Subscribe: Parameters

| Name | Type | Description |
| --- | --- | --- |
| DeviceKey | Hex Number | Composed of the digits of the MAC address of eth1 |
| ServiceID | Number | A unique identifier for service |

TABLE 4(B)

Subscribe: Return Values

| Name | Type | Description |
| --- | --- | --- |
| Result | Number | Boolean value - 1 if successfully subscribed, 0 otherwise |

TABLE 5(A)

Unsubscribe: Parameters

| Name | Type | Description |
| --- | --- | --- |
| DeviceKey | HexNumber | composed of the digits of the MAC address of eth1 |
| ServiceID | Number | a unique identifier for the service |

TABLE 5(B)

Unsubscribe: Return Values

| Name | Type | Description |
| --- | --- | --- |
| Result | Number | Boolean value - 1 successfully unsubscribed, 0 otherwise |

The parameters and return values used with a GetContactInfo request are set forth in Tables 6(a) and 6(b), below. However, when a subscription server is successfully contacted, "NextDay" and "Time" fields stored within the memory (not shown) of the subscriptions management server 12 preferably will dictate when to contact the server again. If the applications management server 12 fails to contact a server at a specified time, then the applications management server 12 preferably will attempt to establish contact three additional times over the course of the next fifteen minutes, e.g., once every 5 minutes. If all three retries fail, the device should give up and try again in the number of days specified in an "Interval" field, but at the same designated "Time"

TABLE 6(A)

GetContactInfo: Parameters

| Name | Type | Description |
| --- | --- | --- |
| DeviceKey | Hex Number | Composed of the digits of the MAC address of eth1 |

TABLE 6(B)

GetContactInfo: Return Values

| Name | Type | Description |
| --- | --- | --- |
| NextDay | mm/dd/yyyy | The next day to contact the back office |
| Time | hh:ss | The time of day (in 24 hour time) to query the back office |
| Interval | Number | The frequency in days to query the back office |
| URLBase | String | The URL to be used for the next update/verification. The URL contains the protocol, host, and path up to the beginning of the API portion. |

The parameters and return values used with a SetServiceEnabled request are set forth in Tables 7(a) and 7(b), below.

TABLE 7(A)

SetServiceEnabled: Parameters

| Name | Type | Description |
| --- | --- | --- |
| DeviceKey | Hex Number | Composed of the digits of the MAC address of eth1 |

TABLE 7(A)-continued

| SetServiceEnabled: Parameters | | |
|---|---|---|
| Name | Type | Description |
| ServiceID | Number | A unique identifier for the service |

TABLE 7(B)

| SetServiceEnabled: Return Values | | |
|---|---|---|
| Name | Type | Description |
| Result | Number | Boolean value 1 if set enabled successfully, 0 otherwise |

The parameters and return values used with a SetServiceDisabled request are set forth in Tables 8(a) and 8(b), below.

TABLE 8(A)

| SetServiceDisabled: Parameters | | |
|---|---|---|
| Name | Type | Description |
| DeviceKey | Hex Number | composed of the digits of the MAC address of eth1 |
| ServiceID | Number | a unique identifier for the service |

TABLE 8(B)

| SetServiceDisabled: Return Values | | |
|---|---|---|
| Name | Type | Description |
| Result | Number | Boolean value 1 if set disabled successfully, 0 otherwise |

The parameters and return values used with a GetServiceLocation request are set forth in Tables 9(a) and 9(b), below.

TABLE 9(A)

| GetServiceLocation: Parameters | | |
|---|---|---|
| Name | Type | Description |
| ServiceID | Number | a unique identifier for the service |
| DeviceKey | Hex Number | The unique identifier for the machine. |

TABLE 9(B)

| GetServiceLocation: Return Value | | |
|---|---|---|
| Name | Type | Description |
| Hostname | String | Name identifier for the service |
| Path | String | Path from login directory to software |
| Username | String | Username to use to log in with |
| Password string | String | Password for the username |

In another aspect, the GUI 100 (or system front end) may use the support files listed in Table 10(a), below, and the backend support module may use the support files listed in Table 10(b), below.

TABLE 10(A)

| /Path/Filename | Description |
|---|---|
| Ti/Support/Snapin.php | This script displays the available service and its current state. |

TABLE 10(B)

| /Path/Filename | Description |
|---|---|
| /sysUnsubscribe | Script that unsubscribes to the specified value |
| sysSubscriptionQuery | Creates the URI for the query, issues the query and sends the results back. |
| SysUpdateSubscriptions | Script that downloads and installs subscribed software |

Those skilled in the art will appreciate that, in addition to the systems and methodologies described herein, the present invention is directed to the computer software applications, programs, protocols, routines, and instructions (collectively "computer programming instructions") that are used to implement the above-described features and functions. Computer programming instructions preferably are stored within memory of the system, and may be received or transmitted via a communications interface. When executed by a processor (not shown) of the applications management server 12 or database management server 18, the programming instructions will enable the system 10 to perform various methods and processes in accordance with the present invention and, therefore, represent controllers of the system 10 and, potentially, any ASP servers 20(*a*) and 20(*b*) that may be included within the system 10.

In this document, the term "computer program product" is used to refer to any media that may be used to provide programming instructions or data to the system 10, or to any server or processor within the system 10, through for example, the Internet. Examples of such media include any memory products used by or within the system 10, any storage drives or devices (whether fixed or removable) used by or within the system 10, and any signals that may be transmitted to, from, or within the system 10.

Because the invention is susceptible to various modifications and alternative forms, specific examples thereof have been shown in the drawings and are herein described in detail. It should be understood, however, that the invention is not to be limited to the particular forms or methods disclosed, but to the contrary, the invention should encompass all modifications, alternatives, and equivalents falling within the spirit and scope of the appended claims.

What is claimed is:

1. A system for managing software applications over a network, the system comprising:
a subscription management server configured to communicate with at least one software application provider, the subscription management server configured to store at least an identifier for at least one hosted software application; and
an application management server in communication with the subscription management server, the application management server positioned in the network as an intermediary between the subscription management server and a client, the application management server configured to request the subscription management server for access to the at least one hosted software application;

wherein the subscription management server is configured to selectively provide the application management server access to the at least one hosted software application; and wherein the hosted software application is at least in part under the control of the at least one software application provider, the at least one software application provider in communication with the subscription management server and configured to deliver the at least one hosted software application to the client.

2. The system of claim 1, wherein the software application provider is an organization that distributes open source applications.

3. The system of claim 2, wherein the organization provides the at least one hosted software application without any modifications.

4. The system of claim 2, wherein the at least one hosted software application is modified, altered, supplemented or otherwise augmented by the organization.

5. The system of claim 2, wherein the single organization receives the at least one hosted software application from a third party.

6. The system of claim 5, wherein the at least one hosted software application is altered, modified, supplemented or otherwise augmented by the single organization.

7. The system of claim 1, wherein a plurality of organizations provide the subscription management server, the application management server, and the at least one hosted software application.

8. The system of claim 1, wherein the hosted software application is an operating system.

9. A subscription management system for managing software applications over a network, the system comprising:

a subscription management server configured to communicate with at least one software application provider, the at least one software application provider configured to deliver at least one software application to a client, the software application operating in whole or in part under the control of software application provider, the subscription management server configured to store at least an identifier for the at least one software application;

wherein the subscription management server is configured to communicate with an application management server operatively positioned in the network between the subscription management server and the client, the subscription management server configured to receive a request from the application management server for access to the at least one software application; and wherein the subscription management server is configured to provide the application management server access to the at least one software application.

10. The system of claim 9, wherein the software application is operating in whole or in part on a server operated by the software application provider.

11. The system of claim 9, wherein the software application provider resides on a network shared with the subscription management server.

12. The system of claim 9, wherein the software application provider is an open-source organization.

13. The system of claim 12, wherein the organization provides the at least one software application without any modifications.

14. The system of claim 12, wherein the at least one software application is modified, altered, supplemented or otherwise augmented by the organization.

15. The system of claim 9, wherein a single organization provides the subscription management server, the application management server, and the at least one software application.

16. The system of claim 15, wherein the single organization receives the at least one software application from a third party.

17. The system of claim 16, wherein the at least one software application is altered, modified, supplemented or otherwise augmented by the single organization.

18. The system of claim 9, wherein a plurality of organizations provide the subscription management server, the application management server, and the at least one software application.

19. The system of claim 9, wherein the software application provider resides on a third party computer network.

20. A system for managing software applications over a network, the system comprising:

a subscription management server configured to communicate with at least one software application provider, the at least one software application provider configured to deliver at least a portion of a software application to a client, the portion of the software application operating in whole or in part under the control of the software application provider, the subscription management server further configured to store at least an identifier for the at least one software application; and an application management server in communication with the subscription management server, the application management server operatively positioned in the network between the subscription management server and the client, the application management server configured to request the subscription management server for access to the at least one software application;

wherein the subscription management server is configured to selectively provide the application management server access to the at least one software application.

* * * * *